(No Model.)

J. R. TRIGWELL.
VELOCIPEDE.

No. 366,045. Patented July 5, 1887.

WITNESSES:

INVENTOR:
J. R. Trigwell
BY Munn & Co.
ATTORNEYS.

UNITED STATES PATENT OFFICE.

JAMES RICHARD TRIGWELL, OF BRIXTON, COUNTY OF SURREY, ASSIGNOR TO GEORGE WATSON, OF MIDDLESEX, ENGLAND.

VELOCIPEDE.

SPECIFICATION forming part of Letters Patent No. 366,045, dated July 5, 1887.

Application filed December 8, 1886. Serial No. 220,951. (No model.) Patented in England October 14, 1885, No. 12,226.

*To all whom it may concern:*

Be it known that I, JAMES RICHARD TRIGWELL, of Brixton, in the county of Surrey, England, have invented certain new and useful Improvements in Velocipedes, of which the following is a full, clear, and exact description.

This invention relates to improvements in the pivotal joint by which the steering-head of a velocipede is connected to the neck, and is chiefly applicable to that class of bicycles and tricycles in which the head is chambered at the back to receive the neck on the backbone of the machine.

The invention consists in the construction and combination of parts and details, as hereinafter fully described, and particularly pointed out in the claims.

Reference is to be had to the accompanying drawings, forming part of this specification, in which similar letters of reference indicate corresponding parts in both the figures.

Figure 1:
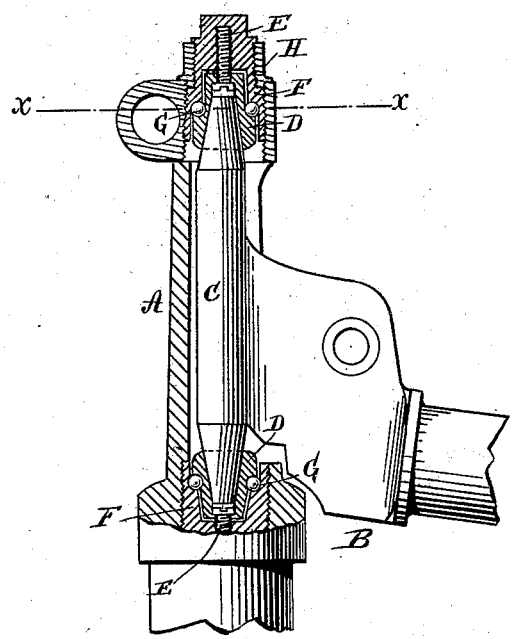
Figure 2:
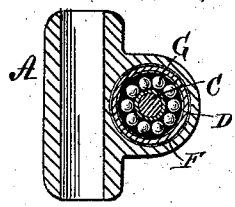

Figure 1 is a vertical sectional view of my improved head and neck joint; and Fig. 2 is a sectional plan view of the same on the line $x\ x$, Fig. 1.

A is the steering-head, chambered at the back to receive the neck B on the backbone of the machine. The neck is formed at its forward end into a spindle, C, conical at each end. I prefer to make this spindle of soft steel, so that when its coned ends are received in corresponding sockets in the rotary bearings D and properly adjusted they will become firmly seated therein. The rotary bearings D are held loosely by means of screws E within the tubular ends of nuts F, screwed into the upper and lower ends of the head A, and correspondingly-grooved annular shoulders are formed on the outside of the bearings D and on the inner side of the nuts F to form seats for rows of anti-friction balls G. A jam nut, H, is screwed on the outer end of the upper nut, F. The bearings D turn freely on the screws E within the nuts F, the spindle C turning with said bearings, so that the wear and friction are entirely taken up by the annular seats on the nuts and bearings and the interposed balls. The spindle C thus possesses all the firmness of a hardened spindle without brittleness and liability to breakage.

For detaching the neck B the upper nut, F, is unscrewed from the head, carrying with it the upper bearing, D, when the spindle C may be raised from the lower bearing and removed from the head. The lower nut and bearing are removed together in the same way. Wear is readily taken up by means of the upper nut.

Having thus described my invention, I claim as new and desire to secure by Letters Patent—

1. The combination, with the head A and neck B, having the spindle C, coned at both ends, of the socketed bearings D, in which the spindle is held, said bearings turning loosely on rows of anti-friction balls, substantially as shown and described.

2. The combination, with the neck B, formed with the coned spindle C, and the head A, of a nut, F, held adjustably in the head, the spindle-bearing D, the screw E, holding the same loosely in the nut, and a row of anti-friction balls interposed between annular seats on the nut and bearing, substantially as shown and described.

3. The soft steel spindle C on the neck, coned at both ends, in combination with the bearings socketed to receive the coned ends of the spindle, anti-friction balls on which the bearings turn, and the head in which the balls are held, substantially as and for the purpose set forth.

In testimony that I claim the foregoing as my invention I have signed my name, in presence of two witnesses, this 8th day of November, 1886.

JAMES RICHARD TRIGWELL.

Witnesses:
 JOHN DE LANNOY WATSON,
  17 *Josephine Avenue, Brixton, London, S. W.*
 HARRY J. JONES,
  71 *Mansfield Road, Kentish Town, London, N. W.*